United States Patent
Sakurai et al.

(10) Patent No.: US 9,893,359 B2
(45) Date of Patent: Feb. 13, 2018

(54) CATHODE BINDER COMPOSITION, CATHODE SLURRY, CATHODE, AND LITHIUM ION SECONDARY BATTERY

(71) Applicant: Denka Company Limited, Tokyo (JP)

(72) Inventors: Yasuaki Sakurai, Machida (JP); Jun Yoshida, Machida (JP); Jun Watanabe, Machida (JP)

(73) Assignee: DENKA COMPANY LIMITED, Tokyo (JP)

(*) Notice: Subject to any disclaimer, the term of this patent is extended or adjusted under 35 U.S.C. 154(b) by 4 days.

(21) Appl. No.: 15/028,115

(22) PCT Filed: Oct. 6, 2014

(86) PCT No.: PCT/JP2014/076709
§ 371 (c)(1),
(2) Date: Apr. 8, 2016

(87) PCT Pub. No.: WO2015/053224
PCT Pub. Date: Apr. 16, 2015

(65) Prior Publication Data
US 2016/0240854 A1    Aug. 18, 2016

(30) Foreign Application Priority Data

Oct. 9, 2013  (JP) ................. 2013-211625
Feb. 4, 2014  (JP) ................. 2014-019359

(51) Int. Cl.
| | |
|---|---|
| H01M 4/62 | (2006.01) |
| H01M 4/131 | (2010.01) |
| H01M 10/0525 | (2010.01) |
| C08F 261/04 | (2006.01) |
| H01M 4/136 | (2010.01) |
| H01M 4/505 | (2010.01) |
| H01M 4/525 | (2010.01) |
| H01M 4/58 | (2010.01) |
| H01M 10/052 | (2010.01) |
| H01M 4/02 | (2006.01) |

(52) U.S. Cl.
CPC ........ *H01M 4/622* (2013.01); *C08F 261/04* (2013.01); *H01M 4/131* (2013.01); *H01M 4/136* (2013.01); *H01M 4/505* (2013.01); *H01M 4/525* (2013.01); *H01M 4/5825* (2013.01); *H01M 4/625* (2013.01); *H01M 10/052* (2013.01); *H01M 10/0525* (2013.01); *H01M 2004/028* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 4,255,532 A * | 3/1981 | Daftary | C08F 261/04 |
| | | | 525/59 |
| 5,415,958 A | 5/1995 | Takahashi et al. | |
| 6,573,004 B1 * | 6/2003 | Igarashi | C08L 29/04 |
| | | | 29/623.1 |
| 2007/0264568 A1 * | 11/2007 | Ryu | H01M 4/0404 |
| | | | 429/213 |
| 2014/0038048 A1 * | 2/2014 | Chung | H01M 4/133 |
| | | | 429/217 |
| 2014/0038049 A1 * | 2/2014 | Chung | H01M 4/622 |
| | | | 429/217 |

FOREIGN PATENT DOCUMENTS

| | | |
|---|---|---|
| JP | 6-172452 A | 6/1994 |
| JP | 2004-227974 A | 8/2004 |
| JP | 2010-218793 A | 9/2010 |
| JP | 2013-065509 A | 4/2013 |
| JP | 2013-084351 A | 5/2013 |
| JP | 2013-098123 A | 5/2013 |
| WO | WO 2011/001848 A1 | 1/2011 |

OTHER PUBLICATIONS

International Search Report (PCT/ISA/210) issued in PCT/JP2014/076709, dated Dec. 16, 2014.
Written Opinion (PCT/ISA/237) issued in PCT/JP2014/076709, dated Dec. 16, 2014.

* cited by examiner

*Primary Examiner* — Katie L Hammer
(74) *Attorney, Agent, or Firm* — Birch, Stewart, Kolasch & Birch, LLP

(57) ABSTRACT

Cathode binder composition having excellent binding properties and oxidation resistance. Also, cathode slurry, cathode, and lithium ion secondary battery produced using the cathode binder composition. The cathode binder composition contains a graft copolymer in which a monomer containing acrylonitrile as the main component is grafted onto polyvinyl alcohol having an average degree of polymerization of 300 to 3000 and a degree of saponification of 70 to 100% by mol. The cathode slurry contains the cathode binder composition, a cathode active material, and a conductive auxiliary. The cathode is produced using the cathode slurry. The lithium ion secondary battery contains a cathode prepared in this manner.

8 Claims, No Drawings

CATHODE BINDER COMPOSITION, CATHODE SLURRY, CATHODE, AND LITHIUM ION SECONDARY BATTERY

TECHNICAL FIELD

The present invention relates to a cathode binder composition, a cathode slurry containing the binder composition, and a cathode and a lithium ion secondary battery utilizing the same.

BACKGROUND ART

In recent years, a secondary battery has been used as power sources of electronic devices, such as notebook-type personal computers and cellular phones, and moreover a development of hybrid vehicles and electric vehicles employing the secondary battery as power sources for the purpose of reducing the environmental loads has been advanced. For the power sources thereof, a secondary battery having a high energy density, a high voltage, and high durability has been demanded. A lithium ion secondary battery has drawn attention as a secondary battery capable of achieving a high voltage and a high energy density.

The lithium ion secondary battery contains members of a cathode, an anode, an electrolyte, and a separator, in which the cathode contains a cathode active material, a conductive auxiliary, a collector, and a binder. As the binder, fluorine-based resin such as polyvinylidene fluoride and polytetrafluoroethylene, a styrene-butadiene copolymer, and an acrylic copolymer have been used (for example, Patent Documents 1 to 3).

CITATION LIST

Patent Literature

[Patent Document 1] JP-A No. 2013-98123
[Patent Document 2] JP-A No. 2013-84351
[Patent Document 3] JP-A No. 1106-172452

SUMMARY OF INVENTION

Technical Problem

In general, however, the binding properties of former binders with metallic foil for use in a collector have been poor in some cases. Moreover, although a high-potential cathode active material has been demanded for increasing the voltage and the energy of a lithium ion secondary battery, former binders usually have sometimes posed problems that the binder has been decomposed due to repeated charging and discharging because the oxidation resistance thereof has been sometimes poor, so that the cathode active material has been removed from the collector, which causes a reduction in the capacity of the battery.

In view of the above-described problems, it is an object of the present invention to provide a binder having good binding capacity with a collector and an active material and further having good oxidation resistance. It is another object of the present invention to provide a cathode slurry, a cathode, and a lithium ion secondary battery produced using the binder.

Solution to Problem

The present inventors have made an extensive effort to achieve the objects, and, as a result, have found that a polymer in which a monomer containing acrylonitrile as the main component is grafted onto polyvinyl alcohol is a binder having high oxidation resistance and good binding capacity.

More specifically, the present invention provides a cathode binder composition of [1] described below:

[1] A cathode binder composition containing a graft copolymer in which a monomer containing acrylonitrile as the main component is grafted onto polyvinyl alcohol having an average degree of polymerization of 300 to 3000 and a degree of saponification of 70 to 100% by mol.

The cathode binder composition may be a cathode binder composition of [2] or [3] described below:

[2] The cathode binder composition according to [1], in which the graft ratio of the graft copolymer is 20 to 150% and the weight average molecular weight of a homopolymer of polyacrylonitrile generated in the graft copolymerization is 30000 to 250000; and

[3] The cathode binder composition according to [1] or [2], in which the amount of the polyvinyl alcohol is 40 to 80% by mass and the amount of the polyacrylonitrile is 60 to 20% by mass in the graft copolymer.

The present invention also provides a cathode slurry of [4] described below:

[4] A cathode slurry containing the binder composition according to any one of [1] to [3], a cathode active material, and a conductive auxiliary.

The cathode slurry may be a cathode slurry of [5] or [6] described below:

[5] The cathode slurry according to [4], in which the cathode active material contains at least one kind selected from the group consisting of $LiCoO_2$, $LiNiO_2$, $Li(Co_XNi_YMn_Z)O_2$ (in which $0<X<1$, $0<Y<1$, $0<Z<1$, and $X+Y+Z=1$), $Li(Ni_XAl_YCo_Z)O_2$ (in which $0<X<1$, $0<Y<1$, $0<Z<1$, and $X+Y+Z=1$), $LiMn_2O_4$, $LiNi_XMn_{(2-x)}O_4$ (in which, $0<X<2$), $LiFePO_4$, $LiMnPO_4$, $LiFe_XMn_{(1-x)}PO_4$ (in which $0<X<1$), $LiCoPO_4$, $Li_3V_2(PO_4)_3$, and $LiNiPO_4$; and

[6] The cathode slurry according to [4] or [5], in which the conductive auxiliary includes at least one or more kinds selected from the group consisting of (i) fibrous carbon, (ii) carbon black, and (iii) a carbon composite in which the fibrous carbon and the carbon black are connected to each other.

The present invention further provides a cathode of [7] and a lithium ion secondary battery of [8] described below:

[7] A cathode, which is produced using the cathode slurry according to any one of [4] to [6]; and

[8] A lithium ion secondary battery having the cathode of [7].

Advantageous Effects of Invention

The present invention can provide a cathode binder composition having good binding properties with an active material and a collector and having good oxidation resistance. The present invention can further provide a battery excellent in cycle characteristics containing a high-potential cathode active material due to the cathode binder composition.

DESCRIPTION OF EMBODIMENTS

Hereinafter, an embodiment for carrying out the present invention is described in detail. The present invention is not limited to the embodiment described below.

<Cathode Binder Composition>

A cathode binder composition according to the embodiment of the present invention (hereinafter sometimes referred to as a "binder composition") contains a graft copolymer in which a monomer containing acrylonitrile as the main component is grafted onto polyvinyl alcohol (hereinafter sometimes abbreviated as PVA). The graft copolymer is a copolymer in which a branch of polyacrylonitrile (hereinafter sometimes abbreviated as PAN) is generated in the main chain of polyvinyl alcohol. In the binder composition, a PAN homopolymer and/or a PVA homopolymer which do/does not participate in the graft copolymerization may be mixed in addition to the graft copolymer. Therefore, the binder composition of this embodiment may contain a PAN homopolymer and/or a PVA homopolymer as the resin content (polymer content) in addition to the graft copolymer.

The monomer to be grafted onto the PVA contains acrylonitrile as an essential component in terms of oxidation resistance. As the monomer to be grafted onto the PVA, ethylenically unsaturated carboxylic acid esters such as methyl methacrylate, methyl acrylate, ethyl acrylate, butyl acrylate, 2-ethylhexyl methacrylate, and 2-ethylhexyl acrylate; ethylenically unsaturated carboxylic acids such as (meth)acrylic acid, maleic anhydride, and itaconic acid; styrene; and the like can be used in combination besides the acrylonitrile insofar as the oxidation resistance of the binder is not impaired. These substances may be used alone or in combination of two or more kinds thereof. Among the above, ethylenically unsaturated carboxylic esters are preferable, acrylic acid ester and/or methacrylic acid ester are more preferable, and methyl methacrylate is still more preferable. It is more preferable for the monomer to be grafted onto the PVA to contain only acrylonitrile, and monomers such as methyl methacrylate may be used in combination with the acrylonitrile insofar as the effects of the present invention are not impaired.

The acrylonitrile in the monomer to be grafted onto the PVA is the main component of the graft-copolymerized monomer and is preferably 50% by mass or more and more preferably 90% by mass or more of the graft-copolymerized monomer. When the acrylonitrile is 50% by mass or more and more preferably 90% by mass or more of the graft-copolymerized monomer, the oxidation resistance of the binder composition can be improved. The upper limit of the proportion of the acrylonitrile of the graft-copolymerized monomer can be set to 100% by mass or less. The composition of the monomer grafted onto the PVA can be determined by $^1$H-NMR (Proton Nuclear Magnetic Resonance Spectroscopy).

The degree of saponification of the PVA is 70 to 100% by mol, preferably 70% by mol or more and less than 100% by mol, and still more preferably 80 to 90% by mol from the viewpoint of oxidation resistance. When the degree of saponification is less than 70% by mol, the oxidation resistance of the binder decreases. Even when the degree of saponification is 100% by mol, there is no problem in the performance as the binder but the production thereof takes a long time in some cases. The degree of saponification of the PVA as used herein is a value to be measured by a method according to JIS K 6726.

The average degree of polymerization of the PVA is 300 to 3000 from the viewpoint of solubility, binding capacity, and binder viscosity. The average degree of polymerization of the PVA is preferably 320 to 2950, more preferably 500 to 2500, and still more preferably 500 to 1800. When the average degree of polymerization of the PVA is less than 300, the binding capacity of the binder with the active material and the conductive auxiliary decreases, which results in a reduction in durability. When the average degree of polymerization of the PVA exceeds 3000, the solubility decreases and the viscosity increases, which sometimes makes it difficult to produce the cathode slurry. The average degree of polymerization of the PVA as used herein is a value to be measured by a method according to JIS K 6726.

The graft copolymer preferably has a graft ratio in a specific range. In the generation of the graft copolymer (in graft copolymerization), a PAN homopolymer is sometimes generated. Therefore, a process of separating the PAN homopolymer from the graft copolymer is required for the calculation of the graft ratio. Although the PAN homopolymer dissolves in dimethylformamide (hereinafter sometimes abbreviated as DMF), PVA and a graft-copolymerized PAN do not dissolve in DMF. The PAN homopolymer can be separated utilizing the difference in solubility by an operation such as centrifugal separation.

Specifically, a graft copolymer in which the PAN content is known is immersed in the DMF of a predetermined amount to elute the PAN homopolymer into the DMF. Next, the liquid in which the graft copolymer is immersed is separated into a DMF soluble content and a DMF insoluble content by centrifugal separation. Herein, in the case of:

a: Amount of the graft copolymer used for the measurement;

b: Percentage by mass of the PAN in the graft copolymer used for the measurement; and c: DMF insoluble amount, the graft ratio can be calculated by Expression (1) shown below, $$\text{Graft ratio}=[c-a\times(100-b)\times 0.01]/[a\times(100-b)\times 0.01]\times 100(\%) \quad (1)$$

The graft ratio of the graft copolymer determined by Expression (1) above is preferably 20 to 150%, more preferably 30 to 140%, and still more preferably 50 to 110%. Due to the fact that the graft ratio of the graft copolymer is preferably 20% or more, more preferably 30% or more, and still more preferably 50% or more, the oxidation resistance is likely to increase. Due to the fact that the graft ratio of the graft copolymer is preferably 150% or less, more preferably 140% or less, and still more preferably 110% or less, the binding properties are likely to increase.

The binder composition of this embodiment may contain the PAN homopolymer and the PVA homopolymer, which may be generated when generating the graft copolymer, in addition to the graft copolymer. The weight average molecular weight of the PAN homopolymer is preferably 30000 to 250000 and more preferably 80000 to 150000. The weight average molecular weight of the PAN homopolymer is preferably 250000 or less, more preferably 200000 or less, and still more preferably 150000 or less so that the viscosity increase of the PAN homopolymer is suppressed and the cathode slurry can be easily produced. The weight average molecular weight of the PAN homopolymer can be determined by GPC (Gel Permeation Chromatography).

The PVA amount in the graft copolymer is preferably 40 to 80% by mass and more preferably 50 to 65% by mass. The PVA amount in the graft copolymer is preferably 40% by mass or more and more preferably 50% by mass or more from the viewpoint of improving the binding properties. The PVA amount in the graft copolymer is preferably 80% by mass or less and more preferably 65% by mass or less from the viewpoint of improving the oxidation resistance. Herein, in this technique, the PVA amount in the graft copolymer refers to the total amount of the mass of the PVA originating from the PVA on which acrylonitrile is graft-copolymerized and the mass of the PVA homopolymer which may be generated in the graft copolymerization in the resin content containing the graft copolymer itself and the PVA homopolymer and the PAN homopolymer which may be generated in the copolymerization.

The PAN amount in the graft copolymer is preferably 20 to 60% by mass and more preferably 35 to 50% by mass. The PAN amount in the graft copolymer is preferably 20% by mass or more and more preferably 35% by mass or more from the viewpoint of improving the oxidation resistance. The PAN amount in the graft copolymer is preferably 60% by mass or less and more preferably 50% by mass or less from the viewpoint of improving the binding properties. Herein, in this technique, the PAN amount in the graft copolymer refers to the total amount of the mass originating from acrylonitrile graft-copolymerized on the PVA and the mass of the PAN homopolymer which may be generated in the graft copolymerization in the resin content containing the graft copolymer itself and the PVA homopolymer and the PAN homopolymer which may be generated in the copolymerization.

The composition ratio (composition ratio of the resin content in the binder composition) of the graft copolymer can be calculated from the reaction rate (degree of polymerization) of acrylonitrile and the composition of the charged amount of each component used for polymerization.

The mass ratio of the PAN generated in the copolymerization, i.e., the total amount of the PAN grafted onto the PVA and the PAN homopolymer, can be calculated from the degree of polymerization of the acrylonitrile and the mass of the acrylonitrile in the preparation. Moreover, the mass ratio of the PVA to the PAN can be calculated by taking the ratio of the mass of the PAN to the mass of the PVA in the preparation.

Specifically, the percentage by mass of the PAN in the graft copolymer can be determined from Expression (2) shown below.

Percentage by mass of PAN in graft copolymer=$d \times 0.01 \times e/(f+d \times 0.01 \times e) \times 100(\%)$ (2)

Herein, in Expression (2), d represents the degree of polymerization (%) of the acrylonitrile, e represents the mass (charged amount) of the acrylonitrile used for the graft copolymerization, and f represents the mass (charged amount) of the PVA used for the graft copolymerization.

The composition ratio (composition ratio of the resin content in the binder composition) of the graft copolymer can also be determined by $^1$H-NMR. For example, when using monomers other than the acrylonitrile for the graft copolymerization in addition to the acrylonitrile, the calculation by Expression (2) is difficult, and therefore the composition ratio can be determined by $^1$H-NMR. The measurement by $^1$H-NMR can be performed using "ALPHA500" (Trade name) manufactured by JEOL Co., Ltd. under the conditions of Measurement solvent: dimethylsulfoxide, Measurement cell: 5 mmφ, Sample concentration: 50 mg/1 ml, and Measurement temperature: 30° C., for example.

A method for producing the binder composition of this embodiment is not particularly limited and a method is preferred which includes polymerizing polyvinyl acetate, saponifying the resultant substance to obtain PVA, and then graft-copolymerizing a monomer containing acrylonitrile as the main component onto the PVA.

As a method for polymerizing the polyvinyl acetate, known arbitrary methods, such as bulk polymerization and solution polymerization, can be used.

As an initiator for use in the polymerization of the polyvinyl acetate, azo initiators such as azobisisobutyronitrile; organic peroxides such as benzoyl peroxide and bis(4-t-butylcyclohexyDperoxydicarbonate; and the like are mentioned.

The saponification reaction of the polyvinyl acetate can be performed by a method for saponifying the polyvinyl acetate in an organic solvent in the presence of a saponification catalyst, for example.

Examples of the organic solvent include methanol, ethanol, propanol, ethylene glycol, methyl acetate, ethyl acetate, acetone, methyl ethyl ketone, benzene, toluene, and the like. These substances may be used alone or in combination of two or more kinds thereof. Among the above, methanol is preferable.

Examples of the saponification catalyst include basic catalysts such as sodium hydroxide, potassium hydroxide, and sodium alkoxide; acid catalysts such as sulfuric acid and hydrochloric acid; and the like. Among the above, sodium hydroxide is preferable from the viewpoint of the saponification speed.

A method for graft-copolymerizing a monomer containing acrylonitrile as the main component onto polyvinyl alcohol can be performed by solution polymerization. Examples of the solvent to be used include dimethylsulfoxide, N-methylpyrrolidone, and the like, for example.

As the initiator for use in the graft copolymerization, organic peroxides such as benzoyl peroxide; azo compounds such as azobisisobutyronitrile; potassium peroxodisulfate; ammonium peroxodisulfate; and the like can be used, for example.

The binder composition of this embodiment can be dissolved in a solvent for use. Examples of the solvent include dimethylsulfoxide, N-methylpyrrolidone, and the like, for example. The binder composition preferably contains these solvents and may contain one or two or more kinds of these solvents.

The proportion of the solid content (solid content concentration) containing the graft copolymer, the PVA homopolymer, the PAN homopolymer, and the like in the binder composition of this embodiment is not particularly limited and is preferably 1% by mass or more, more preferably 2% by mass or more, and still more preferably 5% by mass or more from the viewpoint of improving the binding properties. From the viewpoint of processability such as ease of application onto a collector, the proportion of the solid content in the binder composition is preferably 50% by mass or less, more preferably 35% by mass or less, and still more preferably 20% by mass or less. Similarly, the content of the solvent in the binder composition is also not particularly limited and is preferably 50 to 99% by mass, more preferably 65 to 98% by mass, and still more preferably 80 to 95% by mass.

Since the binder composition of this embodiment described above in detail contains the graft copolymer described above, the binding properties with a cathode active material and a collector are good and the oxidation resistance is excellent. Therefore, the cathode slurry containing the binder composition makes it possible to obtain a lithium ion secondary battery containing a high-potential cathode active material and having excellent cycle characteristics and rate characteristics and an electrode (cathode) providing such a lithium ion secondary battery. Therefore, the binder composition of this embodiment is more suitable for a lithium ion secondary battery.

<Cathode Slurry>

The cathode slurry according to the embodiment of the present invention contains the above-described binder composition, a cathode active material, and a conductive auxiliary.

(Cathode Active Material)

The cathode active material for use in the cathode is not particularly limited and is preferably at least one kind selected from the group consisting of composite oxides containing lithium and transition metal (lithium transition metal composite oxides) and lithium and transition metal phosphates (lithium transition metal phosphates). More specifically, lithium transition metal composite oxides such as $LiCoO_2$, $LiNiO_2$, $Li(Co_XNi_YMn_Z)O_2$ (in which $0<X<1$, $0<Y<1$, $0<Z<1$, and $X+Y+Z=1$), $Li(Ni_XAl_YCo_Z)O_2$ (in which $0<X<1$, $0<Y<1$, $0<Z<1$, and $X+Y+Z=1$), $LiMn_2O_4$, and $LiNi_XMn_{(2-X)}O_4$ (in which $0<X<2$); and lithium transition metal phosphates such as $LiFePO_4$, $LiMnPO_4$, $LiFe_XMn_{(1-X)}PO_4$ (in which $0<X<1$), $LiCoPO_4$, $Li_3V_2(PO_4)_3$, and $LiNiPO_4$, can be used. It is preferable to use a cathode active material containing one kind or a combination of two or more kinds selected from the substances. Among the cathode active materials, $Li(Co_XNi_YMn_Z)O_2$ ($0<X<1$, $0<Y<1$, $0<Z<1$, and $X+Y+Z=1$), $Li(Ni_XAl_YCo_Z)O_2$ (in which $0<X<1$, $0<Y<1$, $0<Z<1$, and $X+Y+Z=1$), $LiMn_2O_4$, and $LiNi_XMn_{(2-X)}O_4$ (in which $0<X<2$) are more preferable.

(Conductive Auxiliary)

In the cathode slurry of this embodiment, a conductive auxiliary can be blended. It is preferable to use, as the conductive auxiliary, at least one or more kinds selected from the group consisting of (i) fibrous carbon, (ii) carbon black, and (iii) a carbon composite in which fibrous carbon and carbon black are connected to each other. Examples of the fibrous carbon include vapor grown carbon fibers, carbon nanotubes, carbon nanofibers, and the like. Examples of the carbon black include acetylene black, furnace black, Ketjen Black (Registered Trademark), and the like. These conductive auxiliaries may be used alone or in combination of two or more kinds thereof. Among the above, one kind or two or more kinds selected from the group consisting of acetylene black, carbon nanotubes, and carbon nanofibers, is/are preferable.

In the cathode slurry of this embodiment, a carbon composite in which a plurality of conductive auxiliaries and active materials are connected may be blended for improving the conductivity imparting ability and the conductivity of the conductive auxiliaries and the active materials. For example, in the case of a slurry for lithium ion secondary battery electrode, a carbon composite in which fibrous carbon and carbon black are connected to each other, a composite in which lithium-containing phosphate such as carbon-coated $LiFePO_4$ is combined and integrated with fibrous carbon and carbon black, and the like are mentioned. The carbon composite in which fibrous carbon and carbon black are connected to each other is obtained by firing a mixture of fibrous carbon and carbon black, for example. One obtained by firing a mixture of the carbon composite and an active material such as lithium-containing phosphate can also be used as the carbon composite.

In the cathode slurry of this embodiment, the content of each of the binder composition, the cathode active material, and the conductive auxiliary described above is not particularly limited and ranges mentioned below are preferable from the viewpoint of improving the binding properties and imparting good characteristics to a lithium ion secondary battery when producing the battery.

The content of the binder composition is preferably 1 to 20% by mass, more preferably 2 to 15% by mass, and still more preferably 3 to 10% by mass in terms of solid content in the binder composition.

The content of the cathode active material is preferably 50 to 95% by mass, more preferably 60 to 95% by mass, and still more preferably 70 to 90% by mass.

The content of the conductive auxiliary is preferably 1 to 10% by mass and more preferably 3 to 7% by mass.

The content of the conductive auxiliary is preferably 1 to 10 parts by mass and more preferably 3 to 7 parts by mass based on the total amount (100 parts by mass) of the binder, the active material, and the conductive auxiliary. By setting the content of the conductive auxiliary to 1 part by mass or more, the high-speed charging characteristics and the high-output characteristics of the lithium ion secondary battery are improved. By setting the content of the conductive auxiliary to 10 parts by mass or less, a higher-density collector can be obtained, and therefore the charging/discharging capacity of the battery is improved.

<Cathode>

The cathode according to this embodiment of the present invention is produced using the cathode slurry described above. The cathode is preferably produced using a collector and the above-described cathode slurry provided on the collector. The cathode is preferably one for use in lithium ion secondary battery electrodes.

(Cathode Collector)

The cathode of this embodiment is preferably produced by applying and drying the above-described cathode slurry onto a collector. For example, it is preferable to use foil-like aluminum as the collector and the thickness is preferably 5 to 30 μm from the viewpoint of processability.

(Method for Producing Cathode)

As a method for applying the cathode slurry onto the collector, known methods can be used. For example, a reverse roll method, a direct roll method, a blade method, a knife method, an extrusion method, a curtain method, a gravure method, a bar method, a dip method, and a squeeze method can be mentioned. Among the above, the blade method (comma roll or die cut), the knife method, and the extrusion method are preferable. In this case, a good surface state of a coating layer can be obtained by selecting the application method according to the solution properties and the drying properties of the binder. The application may be performed to one surface or both surfaces. In the case of performing the application to both surfaces, the application may be performed to each surface one by one or may be performed to both surfaces at once. The application may be performed continuously, intermittently, or in the form of a stripe. The application thickness, length, and width of the cathode slurry may be determined as appropriate according to the size of a battery. For example, the application thickness of the cathode slurry, i.e., the thickness of a cathode plate, can be set in the range of 10 μm to 500 μm.

As a method for drying the cathode slurry, generally adopted methods can be utilized. In particular, hot air, vacuum, infrared rays, far-infrared rays, electron beams, and low-temperature air is/are preferably used alone or in combination.

The cathode can be pressed as necessary. As a pressing method, generally adopted methods can be used and particularly a die pressing method and a calendar pressing method (cold or hot roll) are preferable. The pressing pressure in the calendar pressing method is not particularly limited and is preferably 0.2 to 3 ton/cm.

<Lithium Ion Secondary Battery>

The lithium ion secondary battery according to the embodiment of the present invention has the above-described cathode and is preferably produced using the cathode and is more preferably configured from the above-described cathode, an anode, a separator, and an electrolyte solution (electrolyte and electrolytic solution).

(Anode)

An anode for use in the lithium ion secondary battery of this embodiment is not particularly limited and can be produced using an anode slurry containing an anode active material. The anode can be produced using an anode collector and an anode slurry provided on the collector, for example. It is preferable for the anode slurry to contain an anode binder, an anode active material, and the above-described conductive auxiliary. The anode binder is not particularly limited and, for example, polyvinylidene fluoride, polytetrafluoroethylene, a styrene-butadiene-based copolymer, an acrylic copolymer, and the like can be used. The cathode binder is preferably fluorine-based resin, more preferably polyvinylidene fluoride and polytetrafluoroethylene, and still more preferably polyvinylidene fluoride.

Examples of the anode active material for use in the anode include carbon materials such as graphite, polyacene, carbon nanotubes, and carbon nanofibers; alloy-based materials such as tin and silicon; oxide materials such as tin oxide, silicon oxide, and lithium titanate; or the like. These substances may be used alone or in combination of two or more kinds thereof.

For example, it is preferable to use foil-like copper as the anode collector and the thickness is preferably 5 to 30 µm from the viewpoint of processability. The anode can be produced using the anode slurry and the anode collector by a method according to the method for producing a cathode described above.

(Separator)

For a separator, any substance such as an electrically insulating porous film, a mesh, and a nonwoven fabric can be used insofar as the substances have sufficient strength. In particular, those having low resistance to the movement of ions of an electrolytic solution and having excellent solution retention may be used. The materials are not particularly limited and inorganic fibers such as glass fibers; organic fibers; synthetic resin such as polyethylene, polypropylene, polyester, polytetrafluoroethylene, and Polyflon; laminar composites thereof; and the like can be mentioned. From the viewpoint of adhesiveness and safety, polyethylene, polypropylene, or a laminar composite film thereof is preferable.

(Electrolyte)

As the electrolyte, any known lithium salt can be used and $LiClO_4$, $LiBF_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiI$, $LiB(C_2H_5)_4$, $LiCF_3SO_3$, $LiCH_3SO_3$, $LiCF_3SO_3$, $LiC_4F_9SO_3$, $LiN(CF_3SO_2)_2$, $LiN(C_2F_5SO_2)_2$, $LiC(CF_3SO_2)_3$, lower fatty acid lithium carboxylate, and the like are mentioned as examples.

(Electrolytic Solution)

The electrolytic solution in which the electrolyte is to be dissolved is not particularly limited. Examples of the electrolytic solution include, for example, carbonates such as propylene carbonate, ethylene carbonate, dimethyl carbonate, diethyl carbonate, and methyl ethyl carbonate; lactones such as γ-butyrolactone; ethers such as trimethoxymethane, 1,2-dimethoxyethane, diethylether, 2-ethoxyethane, tetrahydrofuran, and 2-methyl tetrahydrofuran; sulfoxides such as dimethylsulfoxide; oxolanes such as 1,3-dioxolane and 4-methyl-1,3-dioxolane; nitrogen containing compounds such as acetonitrile, nitromethane, and N-methyl-2-pyrrolidone; esters such as methyl formate, methyl acetate, ethyl acetate, butyl acetate, methyl propionate, ethyl propionate, and phosphoric acid triester; inorganic acid esters such as sulfate ester, nitrate ester, and chloride ester; amides such as dimethylformamide and dimethylacetamide; glymes such as diglyme, triglyme, and tetraglyme; ketones such as acetone, diethyl ketone, methyl ethyl ketone, and methyl isobutyl ketone; sulfolanes such as sulfolane; oxazolidinones such as 3-methyl-2-oxazolidinone; and sultones such as 1,3-propanesultone, 4-butanesultone, and naphthasultone. One or more kinds selected from these electrolytic solutions can be used.

Among the electrolytes and the electrolytic solutions, an electrolytic solution in which $LiPF_6$ is dissolved in carbonates is preferable. The concentration of the electrolyte in the solution varies depending on electrodes and electrolytic solutions to be used and is preferably 0.5 to 3 mol/L.

EXAMPLES

The present invention is more specifically described with reference to Examples and Comparative Example but the present invention is not limited thereto.

Example 1

(Preparation of PVA)

600 parts by mass of vinyl acetate and 400 parts by mass of methanol were charged, nitrogen gas was bubbled for deoxidization, 0.3 parts by mass of bis(4-t-butylcyclohexyl) peroxydicarbonate was charged as a polymerization initiator, and then the mixture was polymerized at 60° C. for 4 hours. The solid content concentration of a polymerization solution when the polymerization was stopped was 48% and the degree of polymerization of the vinyl acetate determined from the solid content was 80%. Methanol vapor was blown into the obtained polymerization solution to remove unreacted vinyl acetate, and then the resultant solution was diluted with methanol in such a manner that the concentration of the polyvinyl acetate was 40% by mass.

To 1200 parts by mass of the diluted polyvinyl acetate solution, 20 parts by mass of a methanol solution of sodium hydroxide having a concentration of 10% by mass was added, and then a saponification reaction was carried out at 30° C. for 1.5 hours.

The solution after the saponification was neutralized with acetic acid, filtered, and then dried at 100° C. for 2 hours to obtain PVA. The average degree of polymerization of the obtained PVA was 330 and the degree of saponification was 89.2% by mol.

<Degree of Polymerization and Degree of Saponification>

The average degree of polymerization and the degree of saponification of the PVA were measured by methods according to JIS K 6726.

(Preparation of Binder A)

A method for preparing a binder A is described below. In "Examples", the binder means a graft copolymer obtained by the present invention.

15 parts by mass of the obtained PVA was added to 222.25 parts by mass of dimethylsulfoxide, and then stirred at 60° C. for 2 hours to be dissolved. Furthermore, 0.124 parts by mass of ammonium peroxodisulfate dissolved in 50.63 parts by mass of acrylonitrile and 12 parts by mass of dimethylsulfoxide was added at 55° C., and then graft-copolymerized under stirring at 60° C. 2 hours after starting the polymerization, the resultant substance was cooled to room temperature, and then the polymerization was stopped.
(Precipitation—Drying)

300 parts by mass of the reaction liquid containing the obtained binder A was added dropwise into 3000 parts by mass of methanol to precipitate the binder A. Filtration was performed to separate a polymer. The polymer was vacuum-dried at room temperature for 2 hours, and then further vacuum-dried at 80° C. for 2 hours. The solid content was 10.2% by mass and the degree of polymerization of the acrylonitrile was 30.9% as calculated from the solid content.

The mass of PAN in the obtained binder A was 51% by mass of the entire polymer, the graft ratio was 102%, and the weight average molecular weight of a PAN homopolymer was 105000. Methods for measuring the same are described in <Composition ratio>, <Graft ratio>, and <Weight average molecular weight> described later. The oxidative decomposition potential determined by a method described later was 6.6 V. The results are shown in Table 1 below.

<Composition Ratio>

The composition ratio of the binder A was calculated from the reaction rate (degree of polymerization) of the acrylonitrile and the composition of the charged amount of each component used for the polymerization. The percentage by mass of the PAN generated in the copolymerization (percentage by mass of the PAN in the graft copolymer) was calculated using Expression (2) shown above from the degree of polymerization (%) of the acrylonitrile, the mass (charged amount) of the acrylonitrile used for the graft copolymerization, and the mass (charged amount) of the PVA used for the graft copolymerization. The "mass ratio" in the table below refers to a mass ratio in the resin content containing the graft copolymer itself and the PVA homopolymer and the PAN homopolymer generated in the copolymerization.

<Graft Ratio>

1.00 g of the binder A was accurately weighed and added to 50 cc of special grade DMF (manufactured by Kokusan Chemical Co., Ltd.), and then the mixture was stirred at 80° C. for 24 hours. Next, the resultant mixture was centrifuged at the number of revolutions of 10000 rpm for 30 minutes with a centrifuge manufactured by Kokusan Co., Ltd. (Type: H2000B, Rotor: H). The filtrate (DMF soluble content) was carefully separated, a pure water insoluble content was vacuum-dried at 100° C. for 24 hours, and then the graft ratio was calculated using Expression (1) shown above.

<Weight Average Molecular Weight>

The filtrate in the centrifugal separation (DMF soluble content) was charged into 1000 ml of methanol to obtain a precipitate. The precipitate was vacuum-dried at 80° C. for 24 hours, and then the weight average molecular weight in terms of standard polystyrene was measured by GPC. The measurement by GPC was performed under the following conditions.

Column: Two columns (GPC LF-804, φ8.0×300 mm, manufactured by Showa Denko K.K.) were connected to be used.
Column temperature: 40° C.
Solvent: 20 mM-LiBr/DMF <Oxidative Decomposition Potential>

10 parts by mass of the binder A was dissolved in 90 parts by mass of N-methylpyrrolidone, 1 part by mass of acetylene black (Denka Black (Registered Trademark) "HS-100", manufactured by Denki Kagaku Kogyo K.K.) was added to 100 parts by mass of the obtained polymer liquid, and then the mixture was stirred. The obtained solution was applied onto aluminum foil in such a manner that the thickness after drying was 20 μm, preliminarily dried at 80° C. for 10 minutes, and then dried at 105° C. for 1 hour to obtain a test piece.

A three electrode cell manufactured by Toyo System Co., Ltd. was assembled using the obtained test piece for a working electrode, lithium for a counter electrode and a reference electrode, and an ethylene carbonate/diethyl carbonate (=½ (volume ratio)) solution (concentration of 1 mol/L) containing $LiPF_6$ as an electrolyte salt for an electrolytic solution. Then, linear sweep voltammetry (hereinafter abbreviated as LSV) was performed at 25° C. at a scanning rate of 10 mV/sec using a potentiostat/galvanostat (1287 type) manufactured by Solartron. The oxidative decomposition potential was defined as a potential at which the current reached 0.1 $mA/cm^2$. It is judged that, when the oxidative decomposition potential is higher, oxidization decomposition is hard to occur and the oxidation resistance is high.

TABLE 1

|  | Example 1 | Example 2 | Example 3 | Example 4 | Example 5 | Example 6 | Example 7 |
|---|---|---|---|---|---|---|---|
| Binder type | A | B | C | D | E | F | G |
| Average degree of polymerization of PVA | 330 | 540 | 1170 | 1760 | 2920 | 1800 | 1790 |
| Degree of saponification of PVA (% by mol) | 89.2 | 88.8 | 88.1 | 87.6 | 85.2 | 71.2 | 80.3 |
| Mass ratio (%) PVA | 49 | 46 | 48 | 50 | 53 | 48 | 53 |
| PAN | 51 | 54 | 52 | 50 | 47 | 52 | 47 |
| PMMA | — | — | — | — | — | — | — |
| Graft ratio (%) | 102 | 109 | 105 | 98 | 84 | 101 | 87 |
| Weight average molecular weight of PAN homopolymer or copolymer of PAN and PMMA | 105000 | 110000 | 103000 | 114000 | 97000 | 115000 | 109000 |
| Oxidative decomposition potential (V) | 6.6 | 6.5 | 6.6 | 6.5 | 6.7 | 6.4 | 6.8 |

|  | Example 8 | Example 9 | Example 10 | Example 11 | Example 12 | Example 13 | Example 14 |
|---|---|---|---|---|---|---|---|
| Binder type | H | I | J | K | L | M | N |
| Average degree of polymerization of PVA | 1750 | 1760 | 1760 | 1760 | 1760 | 1760 | 1760 |

TABLE 1-continued

| | | | | | | | |
|---|---|---|---|---|---|---|---|
| Degree of saponification of PVA (% by mol) | 99.1 | 87.6 | 87.6 | 87.6 | 87.6 | 87.6 | 87.6 |
| Mass ratio (%) PVA | 51 | 79 | 63 | 40 | 54 | 46 | 48 |
| PAN | 49 | 21 | 37 | 60 | 46 | 54 | 48 |
| PMMA | — | — | — | — | — | — | 4 |
| Graft ratio (%) | 92 | 26 | 55 | 144 | 110 | 83 | 105 |
| Weight average molecular weight of PAN homopolymer or copolymer of PAN and PMMA | 99000 | 110000 | 107000 | 105000 | 32000 | 245000 | 121000 |
| Oxidative decomposition potential (V) | 7.0 | 6.2 | 6.4 | 7.0 | 6.4 | 6.5 | 6.2 |

Example 2

The preparation in the polymerization of polyvinyl acetate in Example 1 was changed to 500 parts by mass of vinyl acetate, 500 parts by mass of methanol, and 0.2 parts by mass of bis(4-t-butylcyclohexyl)peroxydicarbonate, and then polymerization was performed at 60° C. for 5 hours. The degree of polymerization was 75%. Unreacted vinyl acetate was removed in the same manner as in Example 1, and then the resultant mixture was diluted with methanol in such a manner that the concentration of the polyvinyl acetate was 30% by mass. To 2000 parts by mass of the polyvinyl acetate solution, 20 parts by mass of a methanol solution of sodium hydroxide having a concentration of 10% by mass was added, and then a saponification reaction was carried out at 30° C. for 1 hour.

Then, the resultant solution was neutralized, filtered, and dried in the same manner as in Example 1 to obtain PVA having an average degree of polymerization of 540 and a degree of saponification of 88.8% by mol.

PAN was polymerized in the same manner as in Example 1 using the obtained PVA to prepare a binder B. The mass ratio of the PVA to the PAN of the binder B was 46:54, the graft ratio was 109%, and the weight average molecular weight of a PAN homopolymer was 110000. The composition ratio, the graft ratio, and the weight average molecular weight of the PAN homopolymer were measured by the same method as that described in Example 1. The same applies to Examples 3 to 13 described below.

Example 3

The preparation in the polymerization of polyvinyl acetate in Example 1 was changed to 0.15 parts by mass of bis(4-t-butylcyclohexyl)peroxydicarbonate, and then polymerization was performed at 60° C. for 5 hours. The degree of polymerization was 74%. Unreacted vinyl acetate was removed in the same manner as in Example 1, and then a saponification reaction was carried out. The resultant mixture was diluted with methanol in such a manner that the concentration of the polyvinyl acetate was 40% by mass. To 2000 parts by mass of the polyvinyl acetate solution, 20 parts by mass of a methanol solution of sodium hydroxide having a concentration of 10% by mass was added, and then a saponification reaction was carried out at 30° C. for 1 hour.

Then, the resultant solution was neutralized, filtered, and dried in the same manner as in Example 1 to obtain PVA having an average degree of polymerization of 1170 and a degree of saponification of 88.1% by mol.

PAN was polymerized in the same manner as in Example 1 using the obtained PVA to prepare a binder C. The mass ratio of the PVA to the PAN of the binder C was 48:52, the graft ratio was 105%, and the weight average molecular weight of a PAN homopolymer was 103000.

Example 4

The preparation in the polymerization of polyvinyl acetate in Example 1 was changed to 800 parts by mass of vinyl acetate, 200 parts by mass of methanol, and 0.08 parts by mass of bis(4-t-butylcyclohexyl)peroxydicarbonate, and then polymerization was performed at 60° C. for 6 hours. The degree of polymerization was 70%. Unreacted vinyl acetate was removed in the same manner as in Example 1, and then the resultant mixture was diluted with methanol in such a manner that the concentration of the polyvinyl acetate was 20% by mass. To 2800 parts by mass of the polyvinyl acetate solution, 20 parts by mass of a methanol solution of sodium hydroxide having a concentration of 10% by mass was added, and then a saponification reaction was carried out at 30° C. for 2 hours.

Then, the resultant solution was neutralized, filtered, and dried in the same manner as in Example 1 to obtain PVA having an average degree of polymerization of 1760 and a degree of saponification of 87.6% by mol.

PAN was polymerized in the same manner as in Example 1 using the obtained PVA to prepare a binder D. The mass ratio of the PVA to the PAN of the binder D was 50:50, the graft ratio was 98%, and the weight average molecular weight of a PAN homopolymer was 114000.

Example 5

The preparation in the polymerization of polyvinyl acetate in Example 1 was changed to 1000 parts by mass of vinyl acetate and 0.01 parts by mass of bis(4-t-butylcyclohexyl)peroxydicarbonate, and then polymerization was performed at 70° C. for 4 hours. The degree of polymerization was 30%. Unreacted vinyl acetate was removed in the same manner as in Example 1, and then the resultant mixture was diluted with methanol in such a manner that the concentration of the polyvinyl acetate was 15% by mass. To 1600 parts by mass of the polyvinyl acetate solution, 20 parts by mass of a methanol solution of sodium hydroxide having a concentration of 10% by mass was added, and then a saponification reaction was carried out at 30° C. for 2 hours.

Then, the resultant solution was neutralized, filtered, and dried in the same manner as in Example 1 to obtain PVA having an average degree of polymerization of 2920 and a degree of saponification of 85.2% by mol.

PAN was polymerized in the same manner as in Example 1 using the obtained PVA to prepare a binder E. The mass ratio of the PVA to the PAN of the binder E was 53:47, the graft ratio was 84%, and the weight average molecular weight of a PAN homopolymer was 97000.

Example 6

A binder F was prepared in the same manner as in Example 4, except changing the saponification reaction time in Example 4 to 1.3 hours. The average degree of polymerization of the obtained PVA was 1800, the degree of saponification was 71.2% by mol, the mass ratio of the PVA to the PAN of the binder F was 48:52, the graft ratio was 101%, and the weight average molecular weight of a PAN homopolymer was 115000.

Example 7

A binder G was prepared in the same manner as in Example 4, except changing the saponification reaction time in Example 4 to 1.5 hours. The average degree of polymerization of the obtained PVA was 1790, the degree of saponification was 80.3% by mol, the mass ratio of the PVA to the PAN of the binder G was 53:47, the graft ratio was 87%, and the weight average molecular weight of a PAN homopolymer was 109000.

Example 8

A binder H was prepared in the same manner as in Example 4, except changing the saponification reaction time in Example 4 to 3 hours. The average degree of polymerization of the obtained PVA was 1750, the degree of saponification was 99.1% by mol, the mass ratio of the PVA to the PAN of the binder H was 51:49, the graft ratio was 92%, and the weight average molecular weight of a PAN homopolymer was 99000.

Example 9

A binder I was prepared in the same manner as in Example 4, except changing the polymerization time in the polymerization of PAN in Example 4 to 1.3 hours. The mass ratio of the PVA to the PAN of the binder I was 79:21, the graft ratio was 26%, and the weight average molecular weight of a PAN homopolymer was 110000.

Example 10

A binder J was prepared in the same manner as in Example 4, except changing the polymerization time in the polymerization of PAN in Example 4 to 1.5 hours. The mass ratio of the PVA to the PAN of the binder J was 63:37, the graft ratio was 55%, and the weight average molecular weight of a PAN homopolymer was 107000.

Example 11

A binder K was prepared in the same manner as in Example 4, except changing the polymerization time in the polymerization of PAN in Example 4 to 3 hours. The mass ratio of the PVA to the PAN of the binder K was 40:60, the graft ratio was 144%, and the weight average molecular weight of a PAN homopolymer was 105000.

Example 12

A binder L was prepared in the same manner as in Example 4, except changing the preparation in the graft copolymerization in Example 4 to 50.5 parts by mass of acrylonitrile and 0.254 parts by mass of ammonium peroxodisulfate and changing the polymerization time to 1 hour. The mass ratio of the PVA to the PAN of the binder L was 54:46, the graft ratio was 110%, and the weight average molecular weight of a PAN homopolymer was 32000.

Example 13

A binder M was prepared in the same manner as in Example 4, except changing the preparation in the graft copolymerization in Example 4 to 50.7 parts by mass of acrylonitrile and 0.054 parts by mass of ammonium peroxodisulfate and changing the polymerization time to 5 hours. The mass ratio of the PVA to the PAN of the binder M was 46:54, the graft ratio was 83%, and the weight average molecular weight of a PAN homopolymer was 245000.

Example 14

A binder N was prepared in the same manner as in Example 4, except changing the preparation in the graft copolymerization in Example 4 to 47.84 parts by mass of acrylonitrile and 2.79 parts by mass of methyl methacrylate. The mass ratio of the PVA to the PAN to polymethyl methacrylate (PMMA) of the binder N was 48:48:4, the graft ratio was 105%, the weight average molecular weight of a copolymer of the PAN and the PMMA was 121000, and the acrylonitrile of a graft-copolymerized monomer was 92% by mass in the entire monomer. The graft ratio and the weight average molecular weight were measured by the same methods as those described in Example 1.

(Composition Ratio)

The mass ratio of the PAN to the PMMA of the binder N was determined by $^1$H-NMR. The measurement by $^1$H-NMR was performed under the following conditions.

Device: ALPHA500 (manufactured by JEOL Ltd.)

Measurement solvent: Dimethylsulfoxide

Measurement cell: 5 mmφ

Sample concentration: 50 mg/1 ml

Measurement temperature: 30° C.

Comparative Example 1

The same operation as that of Example 1 was performed, except changing the preparation in the polymerization of polyvinyl acetate in Example 1 to 500 parts by mass of vinyl acetate, 500 parts by mass of methanol, and 0.5 parts by mass of bis(4-t-butylcyclohexyl)peroxydicarbonate to obtain PVA having an average degree of polymerization of 110 and a degree of saponification of 89.1% by mol.

PAN was polymerized in the same manner as in Example 1 using the obtained PVA to prepare a binder O. The mass ratio of the PVA to the PAN of the binder O was 46:54, the graft ratio was 115%, and the weight average molecular weight of a PAN homopolymer was 99000. Furthermore, the oxidative decomposition potential was measured in the same manner as in Example 1. The results are shown in Table 2.

TABLE 2

|  | Comparative Example 1 | Comparative Example 2 | Comparative Example 3 | Comparative Example 4 | Comparative Example 5 |
|---|---|---|---|---|---|
| Binder type | O | P | Q | R | S |
| Average degree of polymerization of PVA | 110 | 5050 | 1800 | — | 1760 |
| Degree of saponification of PVA (% by mol) | 89.1 | 85.3 | 51.2 | — | 87.6 |
| Mass ratio (%) PVA | 46 | 53 | 47 | 0 | 100 |
| PAN | 54 | 47 | 53 | 100 | 0 |
| PMMA | — | — | — | — | — |
| Graft ratio (%) | 115 | 86 | 107 | — | 0 |
| Weight average molecular weight of PAN homopolymer | 99000 | 119000 | 102000 | 115000 | — |
| Oxidative decomposition potential (V) | 6.4 | 6.2 | 4 | 6.9 | 4.5 |

Comparative Example 2

The same operation as that of Example 5 was performed, except changing the preparation in the polymerization of polyvinyl acetate in Example 1 to 0.006 parts by mass of bis(4-t-butylcyclohexyl)peroxydicarbonate to obtain PVA having an average degree of polymerization of 5050 and a degree of saponification of 85.3% by mol.

PAN was polymerized in the same manner as in Example 1 using the obtained PVA to prepare a binder P. The mass ratio of the PVA to the PAN of the binder P was 53:47, the graft ratio was 86%, and the weight average molecular weight of a PAN homopolymer was 119000.

Comparative Example 3

The same operation as that of Example 4 was performed, except changing the saponification reaction time in Example 4 to 0.5 hours to obtain PVA having an average degree of polymerization of 1800 and a degree of saponification of 51.2% by mol.

PAN was polymerized in the same manner as in Example 1 using the obtained PVA to prepare a binder Q. The mass ratio of the PVA to the PAN of the binder Q was 47:53, the graft ratio was 107%, and the weight average molecular weight of a PAN homopolymer was 102000.

Comparative Example 4

By performing polymerization without adding PVA in the polymerization of PAN in Example 1, a PAN homopolymer was polymerized to prepare a binder R. The weight average molecular weight of a PAN homopolymer was 115000.

Comparative Example 5

The PVA prepared in Example 4 was used as a binder S.

Example 15

A cathode slurry was prepared using the binder A by the following method, and then the peel adhesion strength was measured. Furthermore, a cathode and a lithium ion secondary battery were produced from the cathode slurry, and then the discharge rate characteristics and the cycle characteristics were evaluated. The results are shown in Table 3.

TABLE 3

|  |  |  | Example 15 | Example 16 | Example 17 | Example 18 | Example 19 | Example 20 | Example 21 |
|---|---|---|---|---|---|---|---|---|---|
| Cathode slurry composition (part by mass) |  | Binder type | A | B | C | D | E | F | G |
|  |  | Binder amount | 7 | 7 | 7 | 7 | 7 | 7 | 7 |
|  | Active material | $Li(Ni_{1/3}Mn_{1/3}Co_{1/3})O_2$ | 87.42 | 87.42 | 87.42 | 87.42 | 87.42 | 87.42 | 87.42 |
|  |  | $LiFePO_4$ | — | — | — | — | — | — | — |
|  |  | $LiNi_{0.5}Mn_{1.5}O_4$ | — | — | — | — | — | — | — |
|  | Conductive auxiliary | Acetylene black | 3.72 | 3.72 | 3.72 | 3.72 | 3.72 | 3.72 | 3.72 |
|  |  | Carbon nanofiber | 1.86 | 1.86 | 1.86 | 1.86 | 1.86 | 1.86 | 1.86 |
| Evaluation items |  | Peel adhesion strength (mN/mm) | 103 | 125 | 143 | 161 | 210 | 123 | 145 |
|  |  | High rate discharge capacity maintenance rate (%) | 94 | 93 | 91 | 92 | 88 | 88 | 90 |
|  |  | Cycle capacity maintenance rate (%) | 73 | 79 | 80 | 81 | 82 | 75 | 77 |
|  |  |  | Example 22 | Example 23 | Example 24 | Example 25 | Example 26 | Example 27 | Example 28 |
| Cathode slurry composition (part by mass) |  | Binder type | H | I | J | K | L | M | N |
|  |  | Binder amount | 7 | 7 | 7 | 7 | 7 | 7 | 7 |
|  | Active material | $Li(Ni_{1/3}Mn_{1/3}Co_{1/3})O_2$ | 87.42 | 87.42 | 87.42 | 87.42 | 87.42 | 87.42 | 87.42 |
|  |  | $LiFePO_4$ | — | — | — | — | — | — | — |
|  |  | $LiNi_{0.5}Mn_{1.5}O_4$ | — | — | — | — | — | — | — |

TABLE 3-continued

| | | | | | | | | |
|---|---|---|---|---|---|---|---|---|
| Conductive auxiliary | Acetylene black | 3.72 | 3.72 | 3.72 | 3.72 | 3.72 | 3.72 | 3.72 |
| | Carbon nanofiber | 1.86 | 1.86 | 1.86 | 1.86 | 1.86 | 1.86 | 1.86 |
| Evaluation items | Peel adhesion strength (mN/mm) | 230 | 181 | 174 | 127 | 130 | 151 | 175 |
| | High rate discharge capacity maintenance rate (%) | 87 | 93 | 92 | 90 | 93 | 85 | 94 |
| | Cycle capacity maintenance rate (%) | 83 | 71 | 75 | 84 | 73 | 83 | 72 |

(Preparation of Cathode Slurry)

8 parts by mass of the obtained binder A was dissolved in 92 parts by mass of N-methyl pyrrolidone (hereinafter abbreviated as NMP) to obtain a binder solution. Furthermore, 3.72 parts by mass of acetylene black (Denka Black, manufactured by Denki Kagaku Kogyo K.K. (Registered Trademark) "HS-100"), 1.86 parts by mass, in terms of solid content, of an NMP dispersion liquid ("MDCNT-D, 5% NMP dispersion liquid", manufactured by MD Nanotech Corporation) of carbon nanofiber as fibrous carbon, and 7 parts by mass, in terms of solid content, of a binder solution were stirred and mixed. After the mixing, 87.42 parts by mass of $Li(Ni_{1/3}Mn_{1/3}Co_{1/3})O_2$ ("Cell Seed (Registered Trademark) 111", manufactured by Nippon Chemical Industrial Co., Ltd.) was added, and then stirred and mixed to obtain a cathode slurry.

<Binding Properties (Peel Adhesion Strength)>

The obtained cathode slurry was applied onto aluminum foil in such a manner that the film thickness after drying was 100 μm, preliminarily dried at a temperature of 80° C. for 10 minutes, and then dried at 105° C. for 1 hour to obtain a cathode plate. The obtained cathode plate was pressed with a roll pressing machine under a linear load of 0.2 to 3 ton/cm to adjust the thickness of the cathode plate to be 75 μm. The obtained cathode plate was cut into a width of 1.5 cm, a pressure sensitive adhesive tape was stuck to a cathode active material surface, and then a stainless steel plate and the tape stuck to the cathode plate were stuck to each other with a double-sided tape. Furthermore, a pressure sensitive adhesive tape was stuck to aluminum foil to obtain a test piece. The stress when the pressure sensitive adhesive tape stuck to the aluminum foil was peeled off at a rate of 50 mm/min in the 180° direction under an atmosphere of 23° C. and a relative humidity of 50% was measured. This measurement was repeated 5 times, and then the average value was determined to be defined as the peel adhesion strength.

(Production of Cathode)

The prepared cathode slurry was applied to both surfaces of 20 μm thick aluminum foil with an automatic coating machine in such a manner that the thickness of each surface was 140 g/m², and then preliminarily dried at 80° C. for 10 minutes. Next, the resultant substance was pressed under a linear load of 0.2 to 3 ton/cm with a roll pressing machine in such a manner that the thickness of both surfaces of a cathode collector was adjusted to be 148 μm. Furthermore, the collector was cut into a width of 54 mm to produce a strip-shaped collector sheet. An aluminum collector tab was welded to an end portion of the collector sheet by ultrasonic waves, and then dried at 105° C. for 1 hour in order to completely remove volatile components, such as a residual solvent and adsorbed moisture, to obtain a cathode.

(Production of Anode)

96.6 parts by mass of graphite ("Carbotron (Registered Trademark) P", manufactured by Kureha Corporation) as an anode active material, 3.4 parts by mass, in terms of solid content, of polyvinylidene fluoride ("KF Polymer (Registered Trademark) #1120", manufactured by Kureha Corporation) as a binder were added, and further an appropriate amount of NMP were added in such a manner that the total solid content was 50% by mass. Then, the mixture was stirred and mixed to obtain an anode slurry.

The prepared anode slurry was applied to both surfaces of 10 μm thick copper foil with an automatic coating machine in such a manner that the thickness of each surface was 70 g/m², and then preliminarily dried at 80° C. for 10 minutes. Next, the resultant substance was pressed with a roll pressing machine under a linear load of 0.2 to 3 ton/cm in such a manner that the thickness of both surfaces of an anode collector was adjusted to be 90 μm. Furthermore, the anode collector was cut into a width of 54 mm to produce a strip-shaped collector sheet. A nickel collector tab was welded to an end portion of the collector sheet by ultrasonic waves, and then dried at 105° C. for 1 hour in order to completely remove volatile components, such as a residual solvent and adsorbed moisture, to obtain an anode.

(Production of Battery)

The cathode and the anode obtained above were combined, and then wound via a polyethylene microporous film separator having a thickness of 25 μm and a width of 60 mm to produce a spiral wound group. Then, the spiral wound group was inserted into a battery can. Subsequently, 5 ml of a nonaqueous electrolytic solution (Ethylene carbonate/Methyl ethyl carbonate=30/70 (mass ratio) mixed liquid) in which $LiPF_6$ was dissolved with a concentration of 1 mol/L was injected as an electrolyte into a battery container, and then an injection port was sealed by crimping to produce a cylindrical lithium secondary battery having a diameter of 18 mm and a height of 65 mm. The produced lithium ion secondary battery was evaluated for the battery performance by the following methods.

<Discharge Rate Characteristics (High Rate Discharge Capacity Maintenance Rate)>

The produced lithium ion secondary battery was charged at a constant current and a constant voltage at 25° C. under the limitation of 4.29 V and 0.2 ItA, and then discharged to 2.69 V at a constant current of 0.2 ItA. Subsequently, the discharge current was changed to 0.2 ItA and 1 ItA, and then the discharge capacity to each discharge current was measured. For the recovery charge in each measurement, constant current and constant voltage charge at 4.29 V (1 ItA cut) was performed. Then, the high rate discharge capacity maintenance rate in 1 ItA discharge to the second 0.2 ItA discharge was calculated.

<Cycle Characteristics (Cycle Capacity Maintenance Rate)>

Constant current and constant voltage charge at a charge voltage of 4.29 V and at 1 ItA and constant current discharge at an end-of-discharge voltage of 2.69 V and at 1 ItA were performed at an environmental temperature of 25° C. The cycle of charge and discharge was repeatedly performed. Then, the ratio of the discharge capacity at the 500th cycle to the discharge capacity at the 1st cycle was determined to be defined as the cycle capacity maintenance rate.

Examples 16 to 28

The binder A in Example 15 was changed to binders shown in Table 3. Each evaluation was carried out by the same methods as those of Example 15 except the change. The results are shown in Table 3. Examples 16, 18, and 22 were measured for the high rate discharge capacity maintenance rate and the cycle capacity maintenance rate. In Example 16, the high rate discharge capacity maintenance rate was 93% and the cycle capacity maintenance rate was 79%. In Example 18, the high rate discharge capacity maintenance rate was 92% and the cycle capacity maintenance rate was 81%. In Example 22, the high rate discharge capacity maintenance rate was 87% and the cycle capacity maintenance rate was 83%.

Example 29

A cathode slurry, a cathode, an anode, and a lithium ion secondary battery were produced, and then various evaluations were carried out by the method described in Example 15, except changing $Li(Ni_{1/3}Mn_{1/3}Co_{1/3})O_2$ to $LiFePO_4$ ("P2", manufactured by Clariant K.K.) and changing the binder A to the binder D. The results are shown in Table 4. The high rate discharge capacity maintenance rate and the cycle capacity maintenance rate were evaluated by setting the voltage in charging to 4.09 V and the voltage in discharging to 2.09 V. As a result, the high rate discharge capacity maintenance rate was 90% and the cycle capacity maintenance rate was 87%.

TABLE 4

| | | | Example 29 | Example 30 | Example 31 | Example 32 | Example 33 |
|---|---|---|---|---|---|---|---|
| Cathode slurry composition (part by mass) | | Binder type | D | D | D | D | D |
| | | Binder amount | 7 | 7 | 3 | 7 | 7 |
| | Active material | $Li(Ni_{1/3}Mn_{1/3}Co_{1/3})O_2$ | — | — | 91.18 | 87.42 | 87.42 |
| | | $LiFePO_4$ | 87.42 | — | — | — | — |
| | | $LiNi_{0.5}Mn_{1.5}O_4$ | — | 87.42 | — | — | — |
| | Conductive auxiliary | Acetylene black | 3.72 | 3.72 | 3.88 | 5.58 | — |
| | | Carbon nanofiber | 1.86 | 1.86 | 1.94 | — | 5.58 |
| Evaluation items | | Peel adhesion strength (mN/mm) | 135 | 155 | 101 | 143 | 163 |
| | | High rate discharge capacity maintenance rate (%) | 90 | 88 | 87 | 94 | 89 |
| | | Cycle capacity maintenance rate (%) | 87 | 75 | 73 | 75 | 83 |

Example 30

A cathode slurry, a cathode, an anode, and a lithium ion secondary battery were produced, and then various evaluations were carried out by the method described in Example 15, except changing $Li(Ni_{1/3}Mn_{1/3}CO_{1/3})O_2$ to $LiNi_{0.5}Mn_{1.5}O_4$ and changing the binder A to the binder D. The high rate discharge capacity maintenance rate and the cycle capacity maintenance rate were evaluated by setting the voltage in charging to 4.99 V and the voltage in discharging to 2.99 V. As a result, the high rate discharge capacity maintenance rate was 88% and the cycle capacity maintenance rate was 75%.

Examples 31 to 33

According to the formula shown in Table 4, a cathode slurry, a cathode, an anode, and a lithium ion secondary battery were produced, and various evaluations were carried out by the method described in Example 15.

Comparative Examples 6 to 10

A cathode slurry, a cathode, an anode, and a lithium ion secondary battery were produced, and various evaluations were carried out by the method described in Example 15, except changing the binder to binders shown in Table 5.

TABLE 5

| | | | Comparative Example 6 | Comparative Example 7 | Comparative Example 8 | Comparative Example 9 | Comparative Example 10 |
|---|---|---|---|---|---|---|---|
| Cathode slurry composition (part by mass) | | Binder type | O | P | Q | R | S |
| | | Binder amount | 7 | 7 | 7 | 7 | 7 |
| | Active material | $Li(Ni_{1/3}Mn_{1/3}Co_{1/3})O_2$ | 87.42 | 87.42 | 87.42 | 87.42 | 87.42 |
| | | $LiFePO_4$ | — | — | — | — | — |
| | | $LiNi_{0.5}Mn_{1.5}O_4$ | — | — | — | — | — |
| | Conductive auxiliary | Acetylene black | 3.72 | 3.72 | 3.72 | 3.72 | 3.72 |
| | | Carbon nanofiber | 1.86 | 1.86 | 1.86 | 1.86 | 1.86 |

TABLE 5-continued

|  |  | Comparative Example 6 | Comparative Example 7 | Comparative Example 8 | Comparative Example 9 | Comparative Example 10 |
|---|---|---|---|---|---|---|
| Evaluation items | Peel adhesion strength (mN/mm) | 5 | *Defect 2 | 90 | 10 | 92 |
|  | High rate discharge capacity maintenance rate (%) | *Defect 1 | *Defect 3 | 71 | *Defect 1 | 65 |
|  | Cycle capacity maintenance rate (%) |  |  | 50 |  | 47 |

*Defect 1: Due to the peeling of the coating, the production of a battery was not achieved.
*Defect 2: Due to high viscosity, the production of a slurry was not achieved.
*Defect 3: Due to a failure in the preparation of slurry, the production of a battery was not achieved.

The results of Tables 1 and 2 showed that the binder compositions within the scope of the present invention have good oxidation resistance. The results of Tables 3 to 5 showed that the binding properties (peel adhesion strength) of the cathode active material layer and the collector are good. Furthermore, it was shown that the lithium ion secondary batteries produced using the binder compositions within the scope of the present invention have good cycle characteristics and discharge rate characteristics.

The invention claimed is:

1. A cathode binder composition, comprising: a graft copolymer in which a monomer containing acrylonitrile as a main component of 50% by mass or more and optionally one or more monomers selected from the group consisting of ethylenically unsaturated carboxylic acid esters, ethylenically unsaturated carboxylic acids, and styrene is grafted onto polyvinyl alcohol having an average degree of polymerization of 300 to 3000 and a degree of saponification of 70 to 100% by mol.

2. The cathode binder composition according to claim 1, wherein a graft ratio of the graft copolymer is 20 to 150% and a weight average molecular weight of a homopolymer of polyacrylonitrile generated in the graft copolymerization is 30000 to 250000.

3. The cathode binder composition according to claim 2, wherein an amount of the polyvinyl alcohol is 40 to 80% by mass and an amount of the polyacrylonitrile is 60 to 20% by mass in the graft copolymer.

4. A cathode slurry, comprising:
the binder composition according to claim 1;
a cathode active material; and
a conductive auxiliary.

5. The cathode slurry according to claim 4, wherein the cathode active material contains at least one kind selected from the group consisting of $LiCoO_2$, $LiNiO_2$, $Li(Co_XNi_YMn_Z)O_2$ (wherein $0<X<1$, $0<Y<1$, $0<Z<1$, and $X+Y+Z=1$), $Li(Ni_XAl_YCo_Z)O_2$ (wherein $0<X<1$, $0<Y<1$, $0<Z<1$, and $X+Y+Z=1$), $LiMn_2O_4$, $LiNi_XMn_{(2-X)}O_4$ (wherein $0<X<2$), $LiFePO_4$, $LiMnPO_4$, $LiFe_XMn_{(1-X)}PO_4$ (wherein $0<X<1$), $LiCoPO_4$, $Li_3V_2(PO_4)_3$, and $LiNiPO_4$.

6. The cathode slurry according to claim 4, wherein the conductive auxiliary includes at least one or more kinds selected from the group consisting of (i) fibrous carbon,
(ii) carbon black, and
(iii) a carbon composite in which the fibrous carbon and the carbon black are connected to each other.

7. A cathode, which is produced using the cathode slurry according to claim 4.

8. A lithium ion secondary battery, comprising the cathode according to claim 7.

* * * * *